Sept. 3, 1929.  M. G. DE SIMONE  1,726,544
SQUEEZER
Filed May 4, 1928   2 Sheets-Sheet 1

Michele G. de Simone
INVENTOR
BY
ATTORNEY

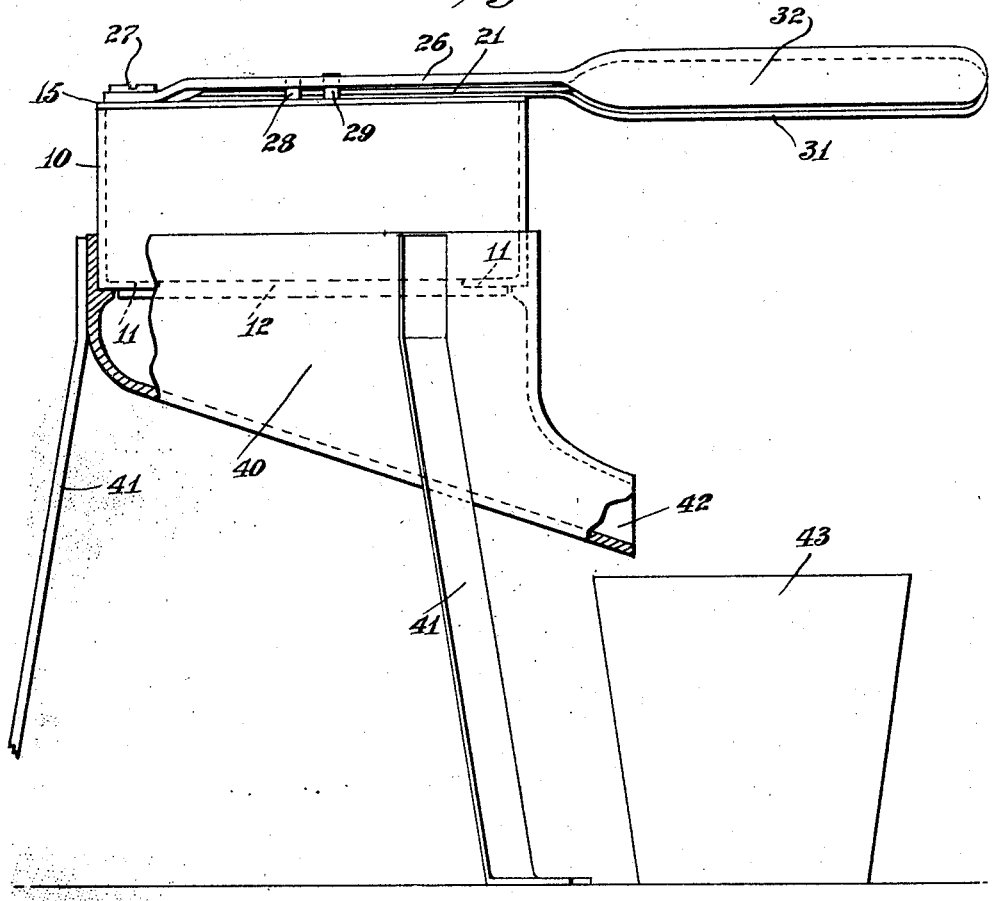

Patented Sept. 3, 1929.

1,726,544

UNITED STATES PATENT OFFICE.

MICHELE G. DE SIMONE, OF STAPLETON, NEW YORK, ASSIGNOR TO FRANK A. HUTSON, OF NEW YORK, N. Y.

SQUEEZER.

Application filed May 4, 1928. Serial No. 275,210.

My invention relates particularly to apparatus or devices for extracting the juice from fruit and vegetables.

The main object is to provide a simple but powerful means for squeezing fruit or vegetables but it is particularly sought to provide a simple form of mechanism which can be readily operated by hand and which is adapted for household, restaurant, and hotel use.

In its preferred form, the invention contemplates the use of a casing in which is mounted independently four jaws between which the article is to be squeezed. These jaws are connected to levers by which they are simultanenously but independently operated. A strainer forms the bottom of the casing through which the juice is strained.

Fig. 6 is a side view and partial section showing a modified form standard for the squeezer.

Figure 1:
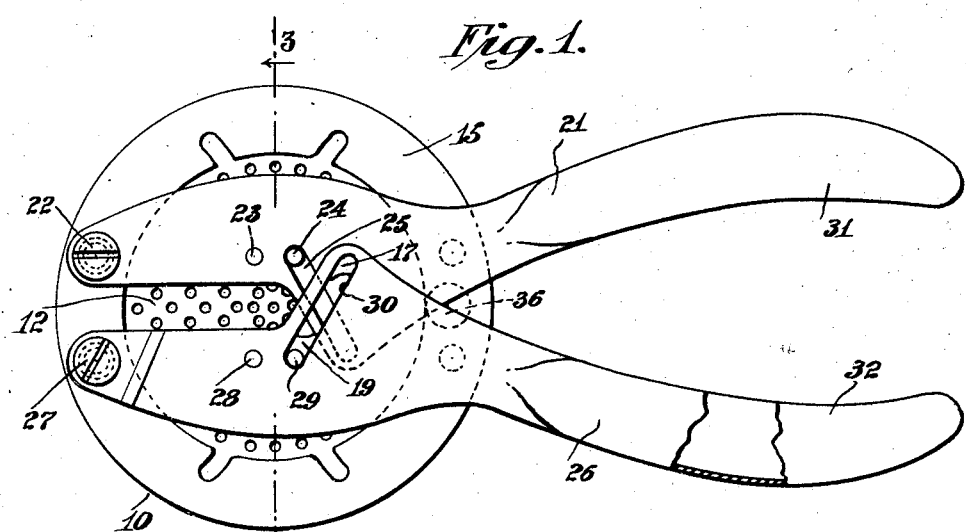
Fig. 1 is a plan view of one form of apparatus embodying my invention showing the parts in the closed position.
Figure 2:
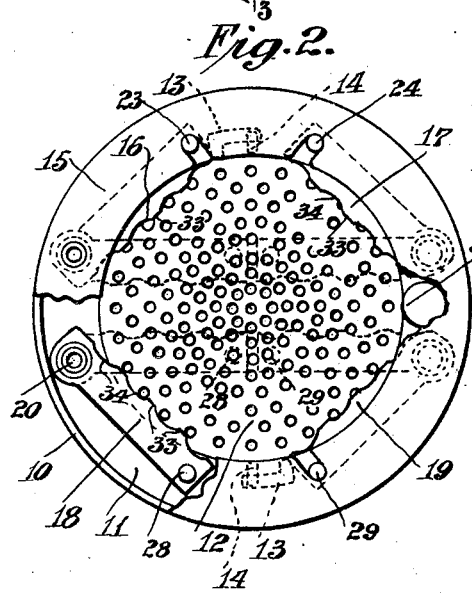
Fig. 2 is a plan view omitting the operating levers and showing the parts in full lines in the open position and in dotted lines in the closed position.

The housing or casing 10 may be of any suitable form and is preferably provided with a bottom flange 11 which is provided with means for supporting a strainer 12. In the form shown the strainer is provided with slots 13 so that it can be conveniently interlocked with lugs or hooks 14 projecting downwardly from the flange 11 of the casing. The top of the casing is partially closed by a ring 15 suitably secured in place.

Four jaws are provided arranged in pairs on opposite sides of the diameter of the casing, the jaws 16 and 17 being on one side and 18 and 19 on the other. Each jaw is pivoted in the casing independently of each of the other jaws on a shaft or axis such as 20. Each pair of jaws has an operating lever which moves independently of the other lever. The lever 21 is pivotally supported by the screw stub 22 and is connected to the jaw 16 by the pin 23. The pin 24 projects upwardly from the jaw 17 into the inclined slot 25 in the lever. In a similar manner the lever 26 is pivoted at 27 and connected to the jaws 18 and 19 by the pins 28 and 29 the latter operating in the slot 30. The outer swinging ends of the levers are preferably formed into handle or grip members 31 and 32 for convenience.

Each pair of jaws is movable independently of the other pair although of course it is intended that both pairs shall be operated at the same time. They are however sufficiently independent so that they work freely and without interference.

Figure 3:
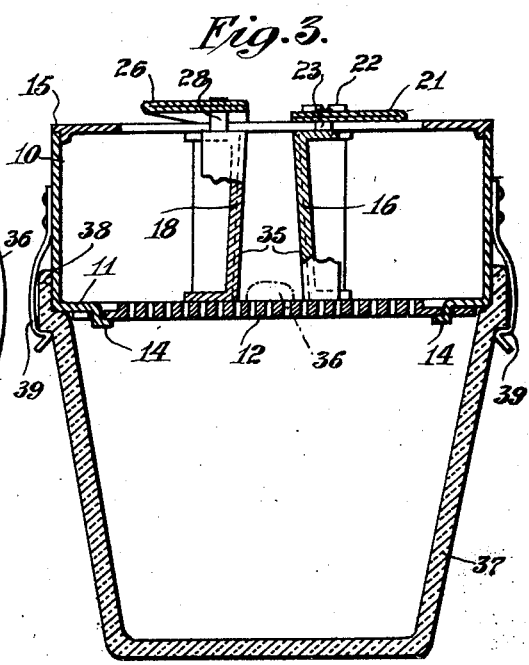
Fig. 3 is a vertical sectional view showing the squeezer mounted on a receptacle for the juice.
Figure 4:
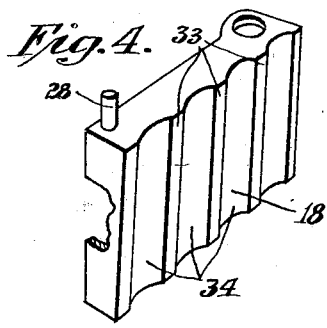
Fig. 4 is a perspective view of one of the jaws.
Figure 5:
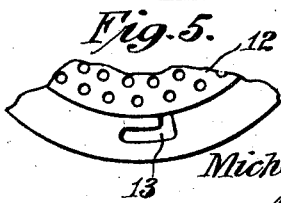
Fig. 5 is a plan view of a fragment of a strainer.

The jaws may conveniently be formed of sheet metal or cast hollow as indicated in Fig. 4 for lightness and strength. Preferably the gripping faces are provided with ribs 33 separated by grooves 34 to more effectively engage the sides of the article to be squeezed. I also preferably incline the faces of the jaws downwardly and away from each other as shown at 35 in Fig. 3 so that there will be no tendency for the article to slip upwardly during the squeezing action. In fact this inclined arrangement forces the article downwardly against the strainer so that all of the juice is forced outwardly through the strainer and there is little likelihood of any escape in an upward direction.

A stop 36 may be provided to limit the inward swinging movement of each pair of jaws.

The device may be readily used with any receptacle, for instance I may provide a receptacle 37 which has a groove 38 to receive the lower edge of the casing. A casing may also have spring clips 39 for holding the parts together if desired.

In the form shown in Fig. 6 the receptacle 40 is mounted on a standard 41 and provided with a spout or discharge outlet 42 so as to collect and discharge the juice into a suitable receptacle 43.

The parts are preferably so constructed and arranged that they can be readily cleaned. It will be understood that changes may be made in the details of construction and arrangement without departing from the spirit and scope of my invention.

I claim:

1. A squeezer comprising a casing having a bottom flange and a top ring, a strainer supported by the bottom flange, two pairs of jaws pivotally supported by said flange and by said ring, and manually operable means for simultaneously actuating said jaws.

2. A squeezer comprising a casing having a detachable strainer at the bottom and a detachable ring at the top, two pairs of jaws pivoted to swing between said ring and said strainer and manually operable means for operating said jaws.

3. A squeezer comprising a casing having a strainer in the bottom, two pairs of jaws pivotally mounted to slide over the upper surface of said strainer, each of said jaws having an inclined gripping surface said gripping surface being inclined so as to provide a recess wider at the bottom than it is at the top and means for actuating said jaws.

4. A squeezer comprising a casing having a strainer in the bottom, two pairs of jaws pivotally supported in said casing, two levers each having one end pivoted to said casing and each lever having a pin and slot engagement with one of the jaws and each lever being connected to one of the other jaws.

5. A squeezer comprising a casing having two pairs of jaws each jaw having a fixed pivot, means for closing said jaws and an abutment serving as a stop for some of said jaws.

6. A squeezer comprising a casing, two pairs of jaws hinged in the casing, means for moving each pair of jaws independently of the other pair of jaws and a stop for one jaw of each pair of jaws.

7. A squeezer comprising a casing having a strainer, two pairs of jaws pivoted in said casing and movable over said strainer, two levers mounted to operate the pairs of said jaws independently of each other.

8. A squeezer comprising a casing having a strainer, two pairs of jaws pivoted in said casing and movable over said strainer, two levers mounted to operate the pairs of said jaws independently of each other and means for limiting the movement of each pair of jaws independently of the other pair of jaws.

9. A squeezer comprising a casing, a strainer forming the bottom of the casing, two pairs of jaws hinged in said casing and movable toward each other, separate handles for the two pairs of jaws for operating the same said jaws having vertically grooved and ribbed gripping surfaces the gripping surfaces of said jaws being inclined inwardly toward the upper part of said jaws.

MICHELE G. DE SIMONE.